US012372069B2

(12) United States Patent
Brandsæter et al.

(10) Patent No.: US 12,372,069 B2
(45) Date of Patent: Jul. 29, 2025

(54) METHOD FOR ADAPTING AN OIL AND GAS PRODUCTION WELL OF A DEPLETED OIL AND GAS RESERVOIR INTO A GEOTHERMAL ENERGY RECOVERY SYSTEM AND THE RESULTING SYSTEM

(71) Applicant: AFFIN AS, Notodden (NO)

(72) Inventors: Helge Brandsæter, Hamresanden (NO); Harald Furu, Oslo (NO)

(73) Assignee: AFFIN AS, Notodden (NO)

( * ) Notice: Subject to any disclaimer, the term of this patent is extended or adjusted under 35 U.S.C. 154(b) by 0 days.

(21) Appl. No.: 18/832,866

(22) PCT Filed: Jan. 24, 2023

(86) PCT No.: PCT/NO2023/050020
§ 371 (c)(1),
(2) Date: Jul. 24, 2024

(87) PCT Pub. No.: WO2023/146413
PCT Pub. Date: Aug. 3, 2023

(65) Prior Publication Data
US 2025/0101961 A1    Mar. 27, 2025

(30) Foreign Application Priority Data
Jan. 25, 2022   (NO) .................................. 20220114

(51) Int. Cl.
*F03G 4/02*    (2006.01)
*F03G 4/00*    (2006.01)
(Continued)

(52) U.S. Cl.
CPC ............... *F03G 4/02* (2021.08); *F03G 4/035* (2021.08); *F24T 10/20* (2018.05); *F24T 10/30* (2018.05)

(58) Field of Classification Search
CPC .. F03G 4/02; F03G 4/035; F24T 10/30; F24T 10/20
See application file for complete search history.

(56) References Cited

U.S. PATENT DOCUMENTS

| 5,860,476 A | 1/1999 | Kjos |
| 6,000,471 A | 12/1999 | Langset |

(Continued)

FOREIGN PATENT DOCUMENTS

| CN | 108756821 | 11/2018 |
| GB | 2549558 | 10/2017 |
| GB | 2589393 | 6/2021 |

OTHER PUBLICATIONS

International Search Report Issued in PCT/NO2023/050020, Mar. 28, 2023, pp. 1-2.
(Continued)

*Primary Examiner* — Shafiq Mian
(74) *Attorney, Agent, or Firm* — Jeffrey S. Melcher; Melcher Patent Law PLLC (57) ABSTRACT

The method and the system are related to means for extraction of geothermal energy from deep wells having been used for oil or gas production. The extracted geothermal energy may then in turn be used in generation of electricity. A first aspect of the invention is a geothermal energy recovery system adapted to recover heat from a depleted oil and gas reservoir being a reservoir storing hot water and, a second aspect of the invention is a method for adapting an oil and gas production well of a depleted oil and gas reservoir into a geothermal energy recovery system for recovering heat from said depleted reservoir. According to this method the energy potential from abandoned wells can be exploited.

19 Claims, 2 Drawing Sheets

(51) Int. Cl.
  *F24T 10/20*  (2018.01)
  *F24T 10/30*  (2018.01)

(56) References Cited

U.S. PATENT DOCUMENTS

| | | |
|---|---|---|
| 6,132,494 A | 10/2000 | Kjos |
| 6,150,601 A | 11/2000 | Schatzmeyer |
| 6,543,537 B1 | 4/2003 | Kjos |
| 8,616,000 B2 | 12/2013 | Parrella |
| 2007/0151591 A1 | 7/2007 | Jefferys |
| 2012/0174581 A1* | 7/2012 | Vaughan ............ F03G 4/074 |
| | | 290/40 C |
| 2013/0300127 A1 | 11/2013 | DiNicolantonio |

OTHER PUBLICATIONS

Written Opinion Issued in PPCT/NO2023/050020, Mar. 28, 2023, pp. 1-6.
Assessment of Deep Geothermal Energy Exploitation Met; the Need for Novel Single-Well Solutions, Falcone, G., Liu, X., Okech, R.R., Seyidov, F., Teodoriu.C. Energy, vol. 160, Issue Oct. 2018, pp. 54-63.
International Search Report Issued in PCT/EP2023/057838, Nov. 7, 2023, pp. 1-2.
Written Opinion Issued in PCT/EP2023/057838, Nov. 7, 2023, pp. 1-6.

* cited by examiner

METHOD FOR ADAPTING AN OIL AND GAS PRODUCTION WELL OF A DEPLETED OIL AND GAS RESERVOIR INTO A GEOTHERMAL ENERGY RECOVERY SYSTEM AND THE RESULTING SYSTEM

TECHNICAL FIELD

The present invention is related to means for extraction of geothermal energy from deep wells having been used for oil or gas production. The extracted geothermal energy may then in turn be used in generation of electricity.

The temperature in oil and gas reservoirs in the North Sea are most commonly in the range between 70° C. degrees and 130° C. degrees. Further north in the Norwegian Sea the temperatures are higher and up to 170-180° C. degrees are observed. When abandoned, these wells represent an unused energy resource. The main cost component when considering geothermal energy from deep wells is the drilling costs. According to this invention this expense is limited.

The amount of energy that can be retrieved is a function of water-volume to surface per unit time and temperature of the water. It is often claimed that efficient production of electricity generally requires a temperature above 120 degrees C.

A first aspect of the invention is a geothermal energy recovery system adapted to recover heat from a depleted oil and gas reservoir being a reservoir storing hot water and, a second aspect of the invention is a method for adapting an oil and gas production well of a depleted oil and gas reservoir into a geothermal energy recovery system for recovering heat from said depleted reservoir. According to this method the energy potential from abandoned wells can be exploited.

BACKGROUND ART

One of the most attractive energy resources is the use of geothermal energy, that is, heat stored underground. It is a clean, abundant energy, but it is not easily accessible because it requires drilling into the ground and this type of installation is very expensive.

When exploiting a hydrocarbon reservoir, it is necessary to plan the drilling of a number of wells that are distributed over the surface of the reservoir. These wells can be production wells or injection wells.

Production wells are used to produce hydrocarbons mainly because the high pressures at which the hydrocarbon is found facilitate its extraction. In addition, hydrocarbons are mainly stored in porous media, i.e. porous rocks, which allow the migration of hydrocarbons through the rock. Production wells require installing a casing that is perforated in the regions where the hydrocarbon is found so that the hydrocarbon can flow from the rock into the casing.

A production tubing is also installed inside the well to transport the hydrocarbon through the well protected by the casing, leaving space between the production tubing and the casing to allow the insertion of auxiliary elements such as power cables, data cables and others.

Injection wells are wells used to inject water by locally increasing pressure. The increase in pressure with water allows the hydrocarbon stored in the wellbore to be displaced outwards, in particular towards the position of one or more production wells to allow a more efficient exploitation of the reservoir.

There are even more efficient exploitation procedures where the same well can act as an injector or as a producer. Techniques such as alternation and the use of well controls according to information available on the reservoir allow a more efficient displacement of hydrocarbon within the rock, for example by avoiding fingering that causes the generation of isolated pockets of hydrocarbon that are difficult or impossible to extract.

Once the reservoir has been fully exploited, the field is left with the facilities used for its exploitation, especially the wells used and the casings and pipelines installed inside them.

Many of these wells have a high pressure due to the injection of water used during the exploitation process or, because internally the stored fluid medium is at a high pressure. In these cases, the fluid tends to flow out of the well unless the top of the well is closed and sealed.

It is known U.S. Pat. No. 6,000,471, it discloses a method for using old wells offshore, earlier used for extraction of hydrocarbons, for the now new use for extraction of geothermal energy. A offshore installation is proposed for using means for converting the heat energy into electricity using pipes in loops to conduct the heat exchange fluid through the existing wells.

It is known US patent application No. 2013/0300127 A1; it discloses a method and apparatus for recovering geothermal heat from abandoned sub sea oil wells and converting it to electricity.

It is known U.S. Pat. No. 8,616,000, it also discloses a system for recovering geothermal heat from predrilled oil wells, other pre-drilled operations and new wells to generate electricity.

The article Assessment of Deep Geothermal Energy Exploitation Methods: the Need for Novel Single-Well Solutions, Falcone, G., Liu, X., Okech, R. R., Seyidov, F., Teodoriu. C. Energy, Volume 160, Issue October 2018, Pages 54-63, summarizes the state of the art with regards to deep well geothermal methods.

It is also known U.S. Pat. Nos. 6,543,537, 5,860,476 disclosing a system whereby fluids can be separated by hydrocyclone installed in an oil well.

The present invention proposes a method of adapting an abandoned facility in an oil and gas reservoir for reuse as a geothermal energy exploitation facility without the drawbacks known in the prior art.

SUMMARY OF INVENTION

A first aspect of the invention is a geothermal energy recovery system adapted to recover heat from a depleted oil and gas reservoir being a reservoir storing hot water.

A second aspect of the invention is a method for adapting an oil and gas production well of a depleted oil and gas reservoir into a geothermal energy recovery system, the geothermal energy recovery system of the first aspect of the invention, for recovering heat from the depleted reservoir, the reservoir storing hot water.

Since the depleted oil and gas comprise facilities particularly designed for exploiting the hydrocarbons stored before the exploitation, such facilities are not adapted for producing hot water particularly for using the hot water in a conversion module adapted to convert heat of the hot water into a different form of energy. This is the case for instance by using a Rankine cycle.

The specific method for adapting an oil and gas production well of a depleted oil and gas reservoir results in a system which is suitable for continuous exploitation of geothermal energy resources and, at a much lower construction cost than a construction planned and executed from scratch, allowing the production of thermal energy to be viable in situations where it would not be otherwise.

According to the first aspect of the invention, the system comprises:
- at least a depleted oil and gas production well located at the reservoir, the production well comprising:
  - a casing extended along a path of the well from a wellhead, the casing comprising openings communicating the inner space of the casing and the reservoir;
  - a tubing housed in the casing and extended at least along a path portion of the casing, being adapted to convey a hot fluid from the reservoir to the wellhead, the hot fluid comprising hot water and optionally non-water components;
- a conversion module comprising an inlet port connected to the tubing, the conversion module adapted to convert heat of hot water produced by the tubing at the wellhead into a different form of energy.

The installation that allows the exploitation of geothermal energy according to the invention makes use of a well that has previously been a hydrocarbon producer. This production well already has structural and service elements that are used in the installation that now allows geothermal energy to be extracted from the same well.

The casing is a structural element that stabilizes the borehole walls after the drilling operation. The casing extends along the well trajectory and this trajectory does not have to be straight, there are wells that for example have a downward trajectory and, at the bottom show a curve to follow horizontally along a certain layer of rock.

Usually the rock is porous, storing hydrocarbon in its pores. If the pores do not communicate with each other, it is not possible for the hydrocarbon to migrate from each point of the rock where it is stored to the well to be extracted later. In these cases, there are techniques that generate cracks in the rock to favor migration and, when it already exists, increase the migration flow rate from the rock to the well.

The casing comprises openings that allow entry from the outside of the casing to the inside while maintaining structural stability.

Once the oil has entered into the casing in a section isolated from the rest, it is transported to the surface through an inner tube. Between the pipe and the casing there is a space that allows the addition of conduits or other service elements such as cables or signal transmission media for communication with axillary elements located inside the well.

Since the well is already depleted, the rock now only stores water and possibly hydrocarbon remains that have not been exploited.

The water is hot water at an elevated temperature corresponding to the temperature inside the reservoir. It is the heat stored in the water mass inside the reservoir that is intended to be exploited by the present invention.

For this purpose the identified elements allow the transport of the water using the paths originally intended for the exploitation of hydrocarbons.

Once the hot water is transported to the exterior, it is introduced into a conversion module that transforms the thermal energy into other usable and transportable energy. According to a preferred example, the conversion module is adapted to convert the heat from the hot water into electricity.

According to a preferred example, since the highest temperatures reached may be in the range between 120° and 180° C., the use of a thermal cycle with water may not be suitable since it requires higher hot source temperatures. In this case it is appropriate to use organic substances with lower boiling points to be the substance subjected to the thermal cycle.

According to this first aspect of the invention, the system the production well of the system further comprises:
- at least one first opening of the casing to allow hot fluid produced by the reservoir to enter into the casing;
- at least one second opening of the casing to allow at least non-water components of the hot fluid to exit from the casing to the reservoir;
- a water cleaner comprising an input port adapted to receive the hot fluid entered through the at least one first perforation, further adapted to clean it separating water an non-water components, and further adapted to supply water to the tubing through a first output port and non-water components to the reservoir through a second output port in fluid communication with the at least one second opening.

The direct flow of water from the reservoir improves use of the heat potential in the reservoir. The inclusion of a downhole waste-water separator limits the environmental impact and allow for the use of hot reservoir water directly.

The removal of non-water components in the fluid flow reduces corrosion or scale build-ups in the pipes and thereby reduce the need for maintenance.

The specific configuration of a water cleaner having an input port adapted to receive the hot fluid entered through the at least one fist perforation allows to process all the hot water produced by the production well. From this stream of hot water, the water cleaner performs a separation wherein the water with components that are not water are reintroduced into the reservoir without any negative impact on the environment and, a minimum transport effort of non-water components.

According to an embodiment, the system further comprises a first packer wherein:
- the first packer is housed in the casing;
- the first packer and the water cleaner are separated from each other a distance according to the path direction of the well stablishing an exchange space,
- the first packer closes the space between the casing and the tubing at the end of the tubing while allowing the fluid communication between the first output port of the water cleaner and the tubing and, the first packer also closes the space between the tubing and the casing,
- the exchange space is in fluid communication with the at least one second opening and the second output port of the water cleaner, and;
- the water cleaner blocks the passage of a fluid with the casing.

According to this embodiment, the specific distribution of the two flows, the water flow and the separated fluid with non-water components is distributed by the assistance of a first packer.

Along the description the term water with no other adjectives is used for "clean water" and non-water components are interpreted as being in a fluid that may comprise water as excipient but also comprises non-water components such as hydrocarbon substances.

The first packer closes the end of the tubing the space between the casing and the tubing. Since the first packer and the water cleaner are separated from each other a distance according to the path direction of the well stablishing an exchange space, this space located below of the first packer (wherein below is interpreted as at the opposite side of the wellhead), allows to receive the fluid with non-water components avoiding to propagate through the space between the casing and the tubing. This limitation forces the fluid with non-water components to exit through second openings to the outside of the casing reintroducing it into the reservoir. Permeability of the rock allows the propagation of the fluid with non-water components.

The water cleaner is in fluid communication with the tubing, preferably through a conduit crossing the exchange space, connecting the output port of the water cleaner and the tubing, the tubing transporting the hot water produced by the reservoir to the outside of the well for converting the heat of the hot water into other energy.

According to an embodiment, the system further comprises a second packer for blocking the passage of a fluid between the water cleaner and the casing.

In this embodiment, the second packer the flow of fluids housed in the exchange space into the space between the water cleaner and the casing. This option is needed for instance with the water cleaner has a diameter smaller than the inner diameter of the casing preventing a flow of non-water components to the production section of the casing.

According to an embodiment, the conversion module comprises an outlet port of water for outputting the water after recovering heat that is in fluid communication with the reservoir through a conduit located between the tubing and the casing for reentering the water into the reservoir.

According to this embodiment, a single production well is used since the water that already transfer the heat to the conversion module is reintroduced into the reservoir using the same well. The space between the casing and the tubing allows to reintroduce the water into the reservoir keeping the pressure in the reservoir.

Water exits to the reservoir through openings in the casing. If these specific openings for re-injection of water into the reservoir are located below any of the packers, then the water conduction crosses these packers in a watertight way.

According to another embodiment, the system comprises an injection well and, the conversion module comprises an outlet port of water for outputting the water after recovering heat energy that is connected to the injection well.

This alternative embodiment makes use of a preexisting injection well in the depleted reservoir facility.

The injector well is distanced from the production well. The injection of water that has already passed through the energy conversion module giving up heat at a point away from the producing well has at least three effects:
  a first push effect displacing the hot water in the direction from the injector well towards the producing well;
  a second effect is to distance the reinjection point giving time to the reintroduced water to absorb heat from the rock raising its temperature for when it is again absorbed by the producing well if this is the case and,
  finally, it ensures the maintenance of the pressure in the reservoir avoiding for example variations in the tensional state of the rock or not complying with legal requirements on the reservoir for these same reasons. Reservoir compression can cause subsidence on the surface and should be avoided.

According to another embodiment, the system further comprises a pump for pumping the hot fluid passing through the water cleaner.

The reservoir is at high pressure, however, the pressure conditions may be reduced or the water flow may not be sufficient or constant. The addition of a pump can be done either below the water cleaner or above the water cleaner.

According to another embodiment, it further comprises pressure sensing means adapted to measure the pressure of the fluid produced by the reservoir, and the pump is configured to be activated when the pressure measured by the pressure sensing means is below a predetermined value.

According to this embodiment of the invention, sensing means makes it possible to measure over time the evolution of various parameters, in particular pressure. In this embodiment, a pressure threshold value is previously established so that, when the pressure in the reservoir falls below the threshold value, it is assessed that the assistance of the pump is necessary to ensure the flow of hot water by activating the same.

According to another embodiment, the energy conversion module is adapted to convert heat into electricity, preferably by using a Rankine Cycle of an organic substance.

The temperature of the hot water produced by the production well is what determines the most suitable transformation method, mainly for converting geothermal energy into electricity.

In the usual cases for example found in Northern Europe the temperatures are in the range between 120° C. and 160° C. and, such a low temperature does not allow to operate efficiently in a Rankine cycle with the ambient temperature as the cold sink of the thermodynamic cycle. In these cases other substances, of organic nature and with a lower boiling temperature, are chosen to establish a thermal cycle where the hot source operates at lower temperatures.

According to another embodiment, the tubing comprises a thermal insulating covering layer.

The insulating covering layer of the tubing increases the temperature of the hot water coming out of the well allowing a better utilization of geothermal energy.

According to another embodiment, the water cleaner comprises a cyclone or a gravity separator.

This is a specific water cleaner that is very effective. The energy needed by the water cleaner may be provided from the facilities located at the surface of, by means of a generator using a pressure gradient of the produced hot water.

According to another embodiment, the system comprises mechanical or electrical control means adapted to open or to block, selectively, one or more perforations of the casing.

These means allow to close the entrance or exit of any of the flows of water and non-water components or even to shut-down the system.

A second aspect of the invention is a method for adapting an oil and gas production well of a depleted oil and gas reservoir into a geothermal energy recovery system for recovering heat from the depleted reservoir, the reservoir storing hot water, the method comprising the following steps:
  selecting at least a depleted oil and gas production well located at the reservoir, the production well comprising:
    a casing extended along a path of the well from a wellhead, the casing comprising openings communicating the inner space of the casing and the reservoir;
  installing, if not present in the selected production well, a tubing housed in the casing and extended at least along a path portion of the casing, being adapted to convey a hot fluid from the reservoir to the wellhead, the hot fluid comprising hot water and optionally non-water components;

installing a conversion module comprising an inlet port connected to the tubing, adapted to convert heat of hot water produced by the tubing at the wellhead into a different form of energy;

identifying at least one first opening of the casing to allow hot fluid produced by the reservoir to enter into the casing;

identifying at least one second opening of the casing to allow at least non-water components of the hot fluid to exit from the casing to the reservoir;

installing a water cleaner comprising an input port adapted to receive the hot fluid entered through the at least one first perforation, further adapted to clean it separating water and non-water components, and further adapted to supply water to the tubing through a first output port and non-water components to the reservoir through a second output port in fluid communication with the at least one second opening.

Once the elements of the production well that are part of the facilities located in the depleted reservoir are selected, the production well is modified at least installing the additional elements already disclosed in the system. The term installing may be interpreted as that the elements or devices to be installed are added to the system and, any preexistent element preventing the installation is previously removed.

Elements and features that are not previously in the facilities of the depleted reservoir are at least: the conversion module configured to convert a hot water flow with the flow and the thermodynamic conditions of the production well, the openings not located at the interest regions of the system according to the first aspect of the invention, the water cleaner and its fluid connections.

Other embodiments are defined in dependent claims and, the detailed description of two embodiments of the invention disclosed below.

BRIEF DESCRIPTION OF DRAWINGS

These and other features and advantages of the invention will be seen more clearly from the following detailed description of a preferred embodiment provided only by way of illustrative and non-limiting example in reference to the attached drawings.

DESCRIPTION OF EMBODIMENTS

As will be appreciated by one skilled in the art, aspects of the present invention may be embodied as a system wherein some of the components are part of the components already existing in a reservoir that has been exploited and others installed subsequently.

Subsequently installed components are used to adapt these pre-existing elements in an installation that allows the exploitation of the geothermal energy stored in the reservoir whose hydrocarbon content has been depleted. The reservoir, however, contains hot water and is a source of heat for any fluid housed inside it since, if a new fluid is introduced into the reservoir, it absorbs heat and raises its temperature to a temperature well above the ambient temperature. It is a second aspect of the invention the method for adapting the preexistent facilities into a geothermal installation according to the first aspect of the invention.

Nearly all oil fields in the North Sea are using enhanced recovery methods, by means of water injection, in order to extract more resources from the fields. Specific wells are drilled as producing wells and other wells are drilled for water injection purposes. Towards the end of life of field, the well flow will comprise mostly water and the reservoirs will to a large degree be water filled.

According to the prior art, this can be exploited by circulating water from the surface to the reservoir. The solution can be classified into two main groups:

Closed loop where water is circulating between surface and bottom of the well in a closed loop without physical contact between the water in the loop and the surrounding water.

An open loop system where hot formation water is allowed to enter the well and brought to surface, used in heat retrieval and reinjected or disposed in water column.

The closed loop alternative has the advantage that the circulating water are completely enclosed and not subject to pollution with possible corrosive effects on the pipes and heat exchangers etc. Furthermore, the impact on environment or operational risks are limited since no fluids are released to the environment.

However, on the negative side the volume of water to surface maybe limited since the heat transfer from formation to the enclosed water pipe is limited by the time it takes.

According to an embodiment of the invention, the system is based on using the produced water from the reservoir directly. There is no need for a downhole heat exchange system, temperatures can be fully exploited and a higher efficiency in an energy conversion module and it can be achieved with less limitations on the water flow sent to surface. According to this system, the well completion can to a large degree be kept as is.

The reservoir fluid can mainly be water but can include other reservoir fluids which over time can contaminate pipes and topside systems. According to any embodiment of the invention, a solution is to introduce downhole systems to remove or separate undesired components and reinject the non-water components into a porous section above the producing reservoir.

This will constitute a significant advantage, for instance, direct disposal of water from a previous producing oil or gas reservoir would not be in compliance with rules and regulations and, no additional pollutants or non-water substances are introduced into the reservoir.

Separation of water from the production flow can be performed using a cyclone or a gravity separator. However, the devices used could encompass a number of different techniques.

Depending on the reservoir pressure, a downhole pump may be considered. Depending on the reservoir pressure a downhole pump may be needed in order to lift water to the surface.

An advantage in using previous oil and gas wells for geothermal applications is that the subsurface is known and mapped in significant detail compared to locations used for wells drilled for geothermal purposes only. The geology down to the oil or gas reservoir section is mapped in detail with information on the different layers and their physical properties such as porosity, permeability, and enclosures.

Knowledge on possible enclosed storage reservoirs at higher levels is available. This particularly applicable for the storage of waste water.

On the topside, according to this embodiment, include well known technology converting geothermal energy into electricity are used, by using the hot water to drive an Organic Rankine Cycle (ORC) system.

The open loop implementation according to any of the embodiments of the invention can be configured either as a single well implementation or as a multi-well application.

In a single well application, the well is configured with upgoing water in the center by using the tubing and used water is reintroduced through the annulus.

In the multi-well application, the water is reinjected by a neighboring well into the layer representing the water reservoir. This will maintain the reservoir pressure and provide pressure 'lift' to the surface for the hot water in the producing well. The authorities may also require that the pressure in the water-producing layer is maintained in order to avoid any subsidence effects on the surface.

First Embodiment. A Single Well Application

Figure 1:
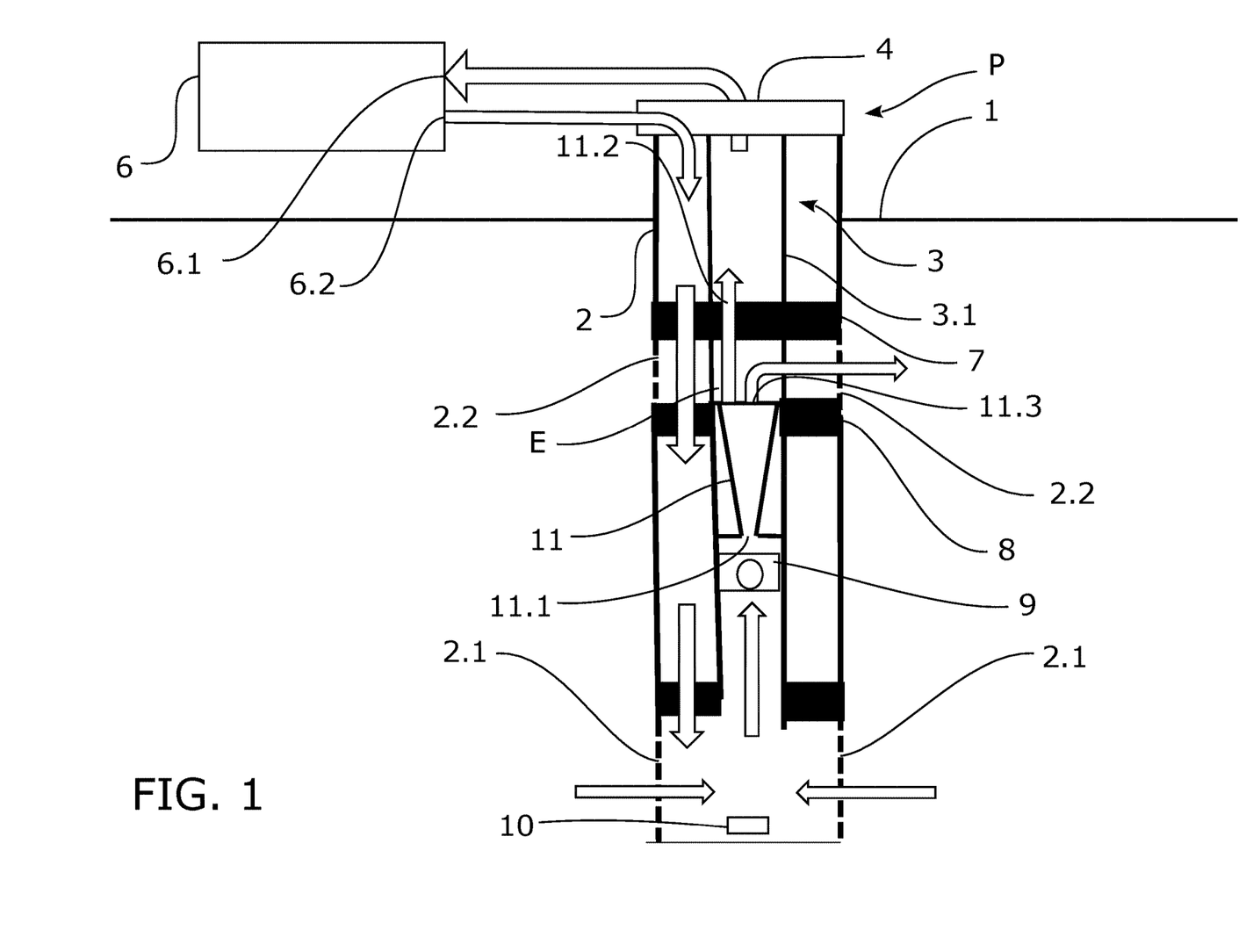
FIG. 1 This figure shows a first embodiment of the invention showing a system comprising an adapted well for producing hot water, being this single well used in a loop.

As it is shown in FIG. 1, it shows an example of a single well implementation. The reservoir (1) comprises a preexisting production well (P) with a borehole reaching the rock or permeable materials containing hot water and some other rests like remaining non-water substances such as hydrocarbons.

According to this embodiment, the production well (P) comprises a casing (2) protecting the inner wall of the well ensuring the structural stability of the well and the tightness of the inner surface of the casing (2).

The casing (2) comprises some openings (2.1, 2.2) that bring the inside of the casing (2) into communication with the porous reservoir material. Thus, when the reservoir (1) contains a pressurized fluid, it enters into the openings (2.1) when the pressure inside is lower or exits out from the openings (2.2) when the pressure inside is higher.

In this embodiment, the casing (2) comprises a plurality of first openings (2.1) at the lower part of the well. If such openings are not in the casing (2) of the depleted facilities then the casing (2) is perforated or even fractured if necessary, so that formation water freely can enter the well.

According to this embodiment, a pump (9) has been installed in order to pump the collected hot water introducing such hot water into a water cleaner (11) through an input port (11.1). In this case the water cleaner is a cyclone separator. In the inner space of the casing (2), there is a pressure sensor (10) and, when the pressure of the hot fluid is below a predetermined threshold, the pump (9) is activated increasing the pressure of the fluid allowing to flow it to the surface.

The water cleaner (11) comprises two output ports, a first output port (11.2) for the hot water with no other substances and, a second output port (11.3) for a fluid comprising the non-water components separated from the flow of hot water already cleaned.

Above the water cleaner (11), the casing (2) has second openings (2.2) for the outlet of the fluid containing non-water elements. The second port (11.3) of the water cleaner (11) is in fluidic communication with these second openings (2.2) so that all non-water elements are reintroduced into the reservoir (1) without being brought to the surface. The non-water elements mainly comprise pollutions stemming from the previous oil and gas reservoir. The injection point is different from the hot water collection point so that it is not, at least immediately, injected in a place that would result in the entry of the same elements that are in principle not suitable for the hot water pipes of the exploitation.

The first outlet port (11.2) of the water cleaner (11) is connected to the hot water outlet tubing (3) and supplies the hot water produced by the well.

In this embodiment, between the tubing (3) and the casing (2) there is a first packer (7) intended to close the annular passage between said elements (2, 3). Between the first packer (7) and the water cleaner (11), both axially spaced, there is a space (E).

In this embodiment, between the first port (11.3) of the water cleaner (11) and the tubing (3) there is a direct connection.

The hot water reaches the surface and is led to a converter module (6) which extracts the thermal energy and transforms it into electricity. The water that has already given up its heat in the converter module (6) is reintroduced into the reservoir (1) through the same production well (P).

The return path of the water that has already given up its heat is established through the annular space between the tubing (3) and the inner wall of the casing (2).

In this embodiment, the water cleaner (11) comprises a second packer (8) which closes the annular space between the water cleaner (11) and the inner face of the casing (2). The water that has already given up its heat passes through openings through the first packer (7) and the second packer (8) respectively until it reaches a zone of the casing (2) in fluidic communication with the reservoir (1) for reintroduction into the reservoir (1).

Second Embodiment. A Multiple Well Application

Figure 2:
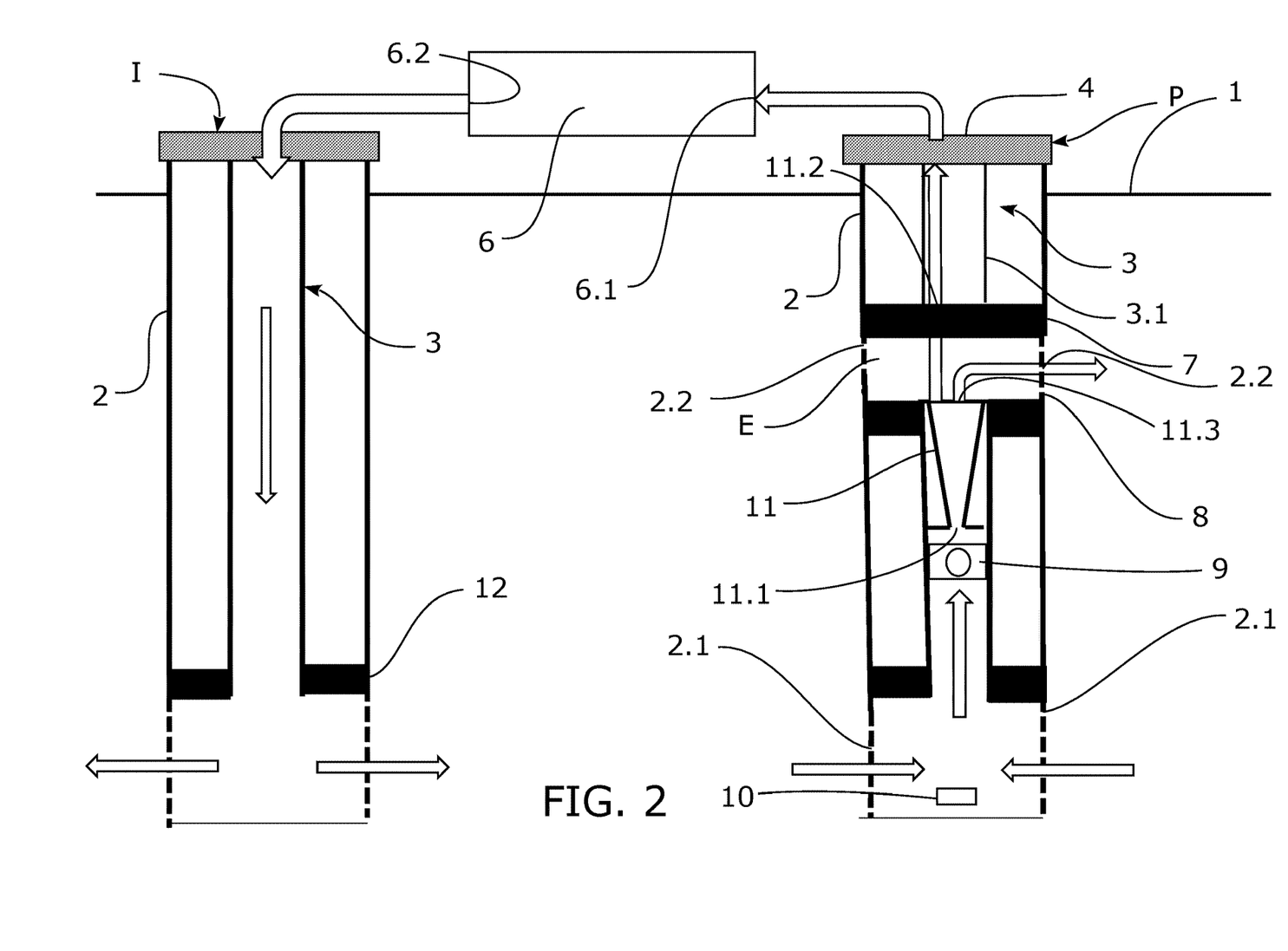
FIG. 2 This figure shows a second embodiment of the invention showing a system comprising an adapted well for producing hot water and an adapted injection well for reintroducing the water already used for converting the geothermal energy into a different form of energy, both wells in an open loop.]

FIG. 2 shows an embodiment comprising a plurality of wells, at least one production well and at least one injection well.

FIG. 2 shows a configuration with an injection well and a producing well wherein according to another embodiments the installation comprises multiple injection wells and one or more producing wells.

The elements of the production well are as disclosed in the first embodiment except that the produced water that has already passed through the conversion module (6) after having transferred the heat to be transformed into electricity, is injected into a separated well, an injection well that has been previously perforated in the reservoir when exploiting it.

The injected water enters into the injection well through the tubing reaching a region of the reservoir preferably in the same layer where, in the production well, hot water is being produced. Although the injection site does not necessarily have to be in the same layer, it may be in a region of the reservoir preferably porous or fractured to be able to absorb the injected flow.

According to this embodiment the water injection ensures that the pressure in the producing well can be maintained.

A second difference in this embodiment is in the space between the first packer (7) and the second packer (8). The outputted fluid comprising non-water components exits from the second outlet port (11.3) of the water cleaner (11) into the exchange space (E) which is in communication with the reservoir (1) through the second openings (2.2) of the casing (2).

The outputted clean water exiting from the first outlet port (11.2) of the water cleaner (11) is conveyed to the tubing (3)

that transport it to the surface and introduced into the conversion module (6) for transforming the heat of the hot water into electricity.

A further embodiment according to the second aspect of the invention is a method for adapting an oil and gas production well (P) of a depleted oil and gas reservoir into a geothermal energy recovery system for recovering heat from the depleted reservoir (1), the reservoir (1) storing hot water. The method comprises the steps:

selecting at least a depleted oil and gas production well (P) located at the reservoir (1), the production well (P) comprising:
a casing (2) extended along a path of the well (P) from a wellhead (4), the casing (2) comprising openings (2.1, 2.2) communicating the inner space of the casing (2) and the reservoir (1).

These are the minimum elements of the pre-installation. This pre-installation may have seals that ensure the closure of the installation once the hydrocarbon reservoir has already been exploited. These seals must be removed to carry out the installation of the new components that allow configuring the installation for the production of hot water and the exploitation of geothermal energy.

The following is a description of minimum actions that allow configuring the geothermal energy exploitation facility in the form of installation stages of various components. However, if any of the components were already in the original well and were operational, the installation stage would be a stage of adaptation to the new operating conditions according to the knowledge of an expert in the field about the operation mode of that device.

The steps are:
installing, if not present in the selected production well (P), a tubing (3) housed in the casing (2) and extended at least along a path portion of the casing (2), being adapted to convey a hot fluid (5) from the reservoir (1) to the wellhead (4), the hot fluid comprising hot water and optionally non-water components;
installing a conversion module (6) comprising an inlet port (6.1) connected to the tubing (3), adapted to convert heat of hot water produced by the tubing (3) at the wellhead (4) into a different form of energy;
identifying at least one first opening (2.1) of the casing (2) to allow hot fluid (5) produced by the reservoir (1) to enter into the casing (2);
identifying at least one second opening (2.2) of the casing (2) to allow at least non-water components of the hot fluid (5) to exit from the casing (2) to the reservoir (1);
installing a water cleaner (11) comprising an input port (11.1) adapted to receive the hot fluid (5) entered through the at least one first perforation (2.1), further adapted to clean it separating water an non-water components, and further adapted to supply water to the tubing (3) through a first output port (11.2) and non-water components to the reservoir (1) through a second output port (11.3) in fluid communication with the at least one second opening (2.2).

If some of the casing (2) perforations (2.1, 2.2) are not sufficient or are not in the right place for the new installation, the casing (2) would be drilled or fractured to achieve fluid communication between the inside of the casing (2) and the reservoir (1).

On this basic configuration, it is possible to carry out the installation of additional elements that result in a configuration of the water cleaner outlet (11) as shown in FIGS. 1 and 2:

Installing a first packer (7) housed in the casing (2) wherein:
the first packer (7) and the water cleaner (11) are separated from each other a distance according to the path direction of the well (P) stablishing an exchange space (E);
the first packer (7) closes the end of the tubing (3) while allowing the fluid communication between the first output port (11.3) of the water cleaner (11) and the tubing (3) and, the first packer (7) also closes the space between the tubing (3) and the casing (2);
the exchange space (E) is in fluid communication with the at least one second opening (2.2) and the second output port (11.3) of the water cleaner (11), and; the water cleaner (11) blocks the passage of a fluid with the casing (2).

The casing (2) inner wall diameter is not part of the design but is the diameter of an element of the production well (P) and cannot be modified. When the water cleaner (11) has a smaller diameter, it is necessary to ensure tightness with the inside of the casing (1). For this reason the method additionally installing a second packer (8) for blocking the passage of a fluid between the water cleaner (11) and the casing (2).

According to the first embodiment using a single well for producing hot water and reinjecting the water once the heat has been transformed into a different energy form, the conversion module (6) comprises an outlet port (6.2) of water for outputting the water after recovering heat that is in fluid communication with the reservoir (1) through a conduit located between the tubing (3) and the casing (2) for reentering the water into the reservoir (1)

As an alternative, according to the second embodiment using at least one production well (P) and at least using one injection well (I), the conversion module (6) comprises an outlet port (6.2) of water for outputting the water after recovering heat energy and, the method further comprises:
selecting at least an injection well (I) located in the reservoir where the production well (P) is located;
connecting the outlet port (6.2) of water of the conversion module (6) to the at least one injection well (I) causing a close loop of the water retrieved from the reservoir (1) being reintroduced into the same reservoir (1).

According to another embodiment, the tubing (3) is thermally insulated.

According to another embodiment that may be implemented in any of the former disclosed embodiments, the method further comprises installing a pump (9) for pumping the hot fluid passing through the water cleaner (11). This is the case when the pressure of the reservoir (1) is not sufficient to produce a sufficient flow of hot water or, the pressure drops and is not assured to be sufficient to maintain a constant production.

According to another embodiment, the facilities may comprise a control unit wherein the method further comprises:
installing pressure sensing means (10) adapted to measure the pressure of the fluid of the reservoir (1);
installing the control unit connected to the pressure sensing means (10) and connected to the pump (9) wherein the control unit is adapted to activate the pump (9) when the pressure measured by the pressure sensing means (10) is below a predetermined value.

The invention claimed is:
1. A geothermal energy recovery system adapted to recover heat from a depleted oil and gas reservoir being a reservoir storing hot water, the system comprising:

at least a depleted oil and gas production well located at the reservoir, the production well comprising:
  a casing extended along a path of the well from a wellhead, the casing comprising openings communicating the inner space of the casing and the reservoir;
  a tubing housed in the casing and extended at least along a path portion of the casing, being adapted to convey a hot fluid from the reservoir to the wellhead, the hot fluid comprising hot water and optionally non-water components;
  a conversion module comprising an inlet port connected to the tubing, the conversion module adapted to convert heat of hot water produced by the tubing at the wellhead into a different form of energy; wherein the production well further comprises:
  at least one first opening of the casing to allow hot fluid produced by the reservoir to enter into the casing;
  at least one second opening of the casing to allow at least non-water components of the hot fluid to exit from the casing to the reservoir;
  a water cleaner comprising an input port adapted to receive the hot fluid entered through the at least one first perforation, further adapted to clean it separating water an non-water components, and further adapted to supply water to the tubing through a first output port and non-water components to the reservoir through a second output port in fluid communication with the at least one second opening.

2. The system according to claim 1, wherein it further comprises a first packer wherein:
  the first packer is housed in the casing;
  the first packer and the water cleaner are separated from each other a distance according to the path direction of the well stablishing an exchange space, the first packer closes the space between the casing and the tubing at the end of the tubing while allowing the fluid communication between the first output port of the water cleaner and the tubing and, the first packer also closes the space between the tubing and the casing,
  the exchange space is in fluid communication with the at least one second opening and the second output port of the water cleaner, and;
  the water cleaner blocks the passage of a fluid with the casing.

3. The system according to claim 2, wherein it further comprises a second packer for blocking the passage of a fluid between the water cleaner and the casing.

4. The system according to claim 2, wherein the conversion module comprises an outlet port of water for outputting the water after recovering heat that is in fluid communication with the reservoir through a conduit located between the tubing and the casing for reentering the water into the reservoir.

5. The system according to claim 1, wherein the system comprises an injection well and, the conversion module comprises an outlet port of water for outputting the water after recovering heat energy that is connected to the injection well.

6. The system according to claim 1, wherein it further comprises a pump for pumping the hot fluid passing through the water cleaner.

7. The system according to claim 1, wherein it further comprises pressure sensing means adapted to measure the pressure of the fluid produced by the reservoir, and the pump is configured to be activated when the pressure measured by the pressure sensing means is below a predetermined value.

8. The system according to claim 1, wherein the energy conversion module is adapted to convert heat into electricity, preferably by using a Rankine Cycle of an organic substance.

9. The system according to claim 1, wherein the tubing comprises a thermal insulating covering layer.

10. The system according to claim 1, wherein the water cleaner comprises a cyclone or a gravity separator.

11. The system according to claim 1, further comprising mechanical or electrical control means adapted to open or to block, selectively, one or more perforations of the casing.

12. A method for adapting an oil and gas production well of a depleted oil and gas reservoir into a geothermal energy recovery system for recovering heat from the depleted reservoir, the reservoir storing hot water, the method comprising:
  selecting at least a depleted oil and gas production well located at the reservoir, the production well comprising:
  a casing extended along a path of the well from a wellhead, the casing comprising openings communicating the inner space of the casing and the reservoir;
  installing, if not present in the selected production well, a tubing housed in the casing and extended at least along a path portion of the casing, being adapted to convey a hot fluid from the reservoir to the wellhead, the hot fluid comprising hot water and optionally nonwater components;
  installing a conversion module comprising an inlet port connected to the tubing, adapted to convert heat of hot water produced by the tubing at the wellhead into a different form of energy;
  identifying at least one first opening of the casing to allow hot fluid produced by the reservoir to enter into the casing;
  identifying at least one second opening of the casing to allow at least non-water components of the hot fluid to exit from the casing to the reservoir;
  installing a water cleaner comprising an input port adapted to receive the hot fluid entered through the at least one first perforation, further adapted to clean it separating water an non-water components, and further adapted to supply water to the tubing through a first output port and non-water components to the reservoir through a second output port in fluid communication with the at least one second opening.

13. The method according to claim 12, wherein if further comprises installing a first packer housed in the casing wherein:
  the first packer and the water cleaner are separated from each other a distance according to the path direction of the well stablishing an exchange space;
  the first packer closes the end of the tubing while allowing the fluid communication between the first output port of the water cleaner and the tubing and, the first packer also closes the space between the tubing and the casing;
  the exchange space is in fluid communication with the at least one second opening and the second output port of the water cleaner, and;
  the water cleaner blocks the passage of a fluid with the casing.

14. The method according to claim 13, wherein it further comprises installing a second packer for blocking the passage of a fluid between the water cleaner and the casing.

15. The method according to claim 12, wherein the conversion module comprises an outlet port of water for outputting the water after recovering heat that is in fluid communication with the reservoir through a conduit located between the tubing and the casing for reentering the water into the reservoir.

16. The method according to claim 12, wherein the conversion module comprises an outlet port of water for outputting the water after recovering heat energy and, the method further comprises:
   selecting at least an injection well located in the reservoir where the production well is located;
   connecting the outlet port of water of the conversion module to the at least one injection well causing a close loop of the water retrieved from the reservoir being reintroduced into the same reservoir.

17. The method according to claim 12, wherein the tubing is thermally insulated.

18. The method according to claim 12, wherein it further comprises installing a pump for pumping the hot fluid passing through the water cleaner.

19. The method according to claim 18, wherein it further comprises:
   installing pressure sensing means adapted to measure the pressure of the fluid of the reservoir; and
   installing a control unit connected to the pressure sensing means and connected to the pump wherein the control unit is adapted to activate the pump when the pressure measured by the pressure sensing means is below a predetermined value.

* * * * *